US011140759B2

(12) United States Patent
Otten

(10) Patent No.: US 11,140,759 B2
(45) Date of Patent: Oct. 5, 2021

(54) METHOD OF MULTI-MODE COLOR CONTROL BY AN LED DRIVER

(71) Applicant: eldoLAB Holding B.V., Son en Breugel (NL)

(72) Inventor: Andy Johanna Elisabeth Otten, Wassenberg (DE)

(73) Assignee: eldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 17/060,855

(22) Filed: Oct. 1, 2020

(65) Prior Publication Data

US 2021/0105876 A1 Apr. 8, 2021

(30) Foreign Application Priority Data

Oct. 2, 2019 (NL) ..................................... 2023938

(51) Int. Cl.
*H05B 45/20* (2020.01)
*H05B 45/10* (2020.01)
*H05B 45/3725* (2020.01)

(52) U.S. Cl.
CPC ............. *H05B 45/20* (2020.01); *H05B 45/10* (2020.01); *H05B 45/3725* (2020.01)

(58) Field of Classification Search
CPC ........ H05B 45/00; H05B 45/10; H05B 45/20; H05B 45/22; H05B 45/24; H05B 45/37; H05B 45/38; H05B 45/46; H05B 45/48; H05B 45/3725; G01J 3/46; G01J 3/50; G01J 3/462; G01J 3/505; G09G 3/32; G09G 2320/0233
See application file for complete search history.

(56) References Cited

U.S. PATENT DOCUMENTS

| 7,315,139 | B1 | 1/2008 | Selvan et al. | |
| 7,478,922 | B2 * | 1/2009 | Garbus, Jr. ............... | G01J 3/46 362/231 |

(Continued)

FOREIGN PATENT DOCUMENTS

WO 2008/0139369 A1 11/2008

OTHER PUBLICATIONS

Netherlands Search Report and Written Opinion for NL Application No. 2023938, dated May 28, 2020, 11 pages.

*Primary Examiner* — Haissa Philogene
(74) *Attorney, Agent, or Firm* — RatnerPrestia

(57) ABSTRACT

Method of controlling an LED fixture comprising a plurality of LEDs, the plurality of LED comprising at least four LEDs, configured to emit light of different colors, the method comprising:
 receiving a set point representing a desired color and intensity for the light to be generated by the LED fixture;
 determining, based on available color characteristics of the plurality of LEDs, at least two different subsets of the plurality of LEDs and a set of intensity set points for each of the at least two different subsets, wherein each set of intensity set points results in obtaining or approximating the desired color and intensity by the LED fixture;
 selecting the subsets of the plurality of LEDs with the corresponding sets of intensity set points which meet a predetermined criterion;
 use a selected subset to drive the plurality of LEDs with the corresponding set of intensity set points.

26 Claims, 15 Drawing Sheets

(56) References Cited

U.S. PATENT DOCUMENTS

| | | | |
|---|---|---|---|
| 7,868,562 B2 * | 1/2011 | Salsbury | H05B 31/50 |
| | | | 315/307 |
| 8,363,069 B2 * | 1/2013 | Aldrich | G01J 3/462 |
| | | | 345/690 |
| 9,241,384 B2 | 1/2016 | van de Ven et al. | |
| 9,253,839 B2 * | 2/2016 | Saes | H05B 45/20 |
| 9,560,714 B1 | 1/2017 | Hjerde | |
| 9,648,695 B2 * | 5/2017 | Hill | H05B 45/375 |
| 10,302,493 B2 * | 5/2019 | Yao | G01J 1/4228 |
| 2013/0207570 A1 | 8/2013 | Bergeler et al. | |
| 2019/0271594 A1 | 9/2019 | Yao | |
| 2020/0235812 A1 * | 7/2020 | Saes | H05B 45/20 |

* cited by examiner

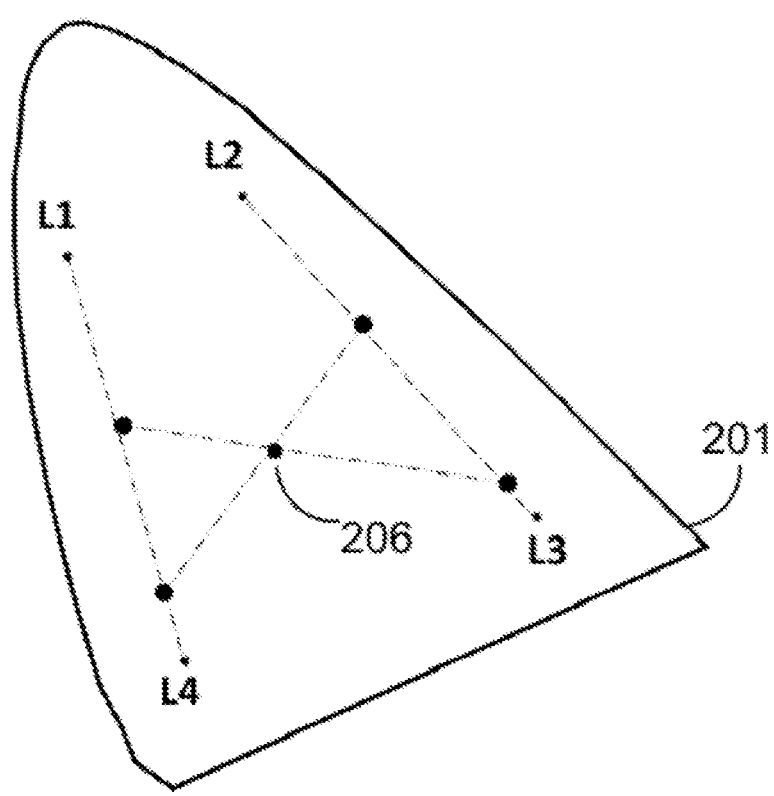

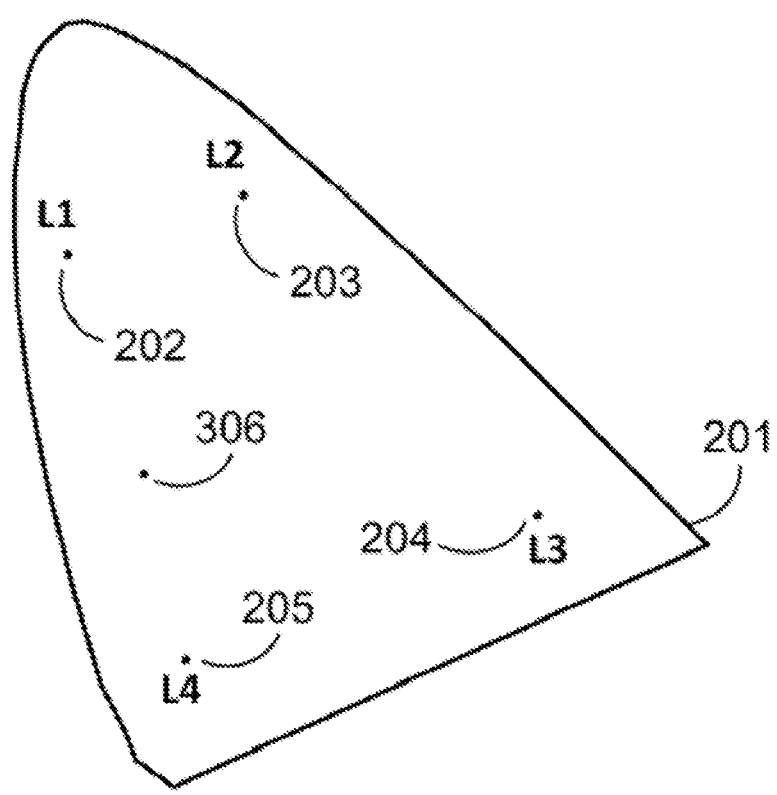

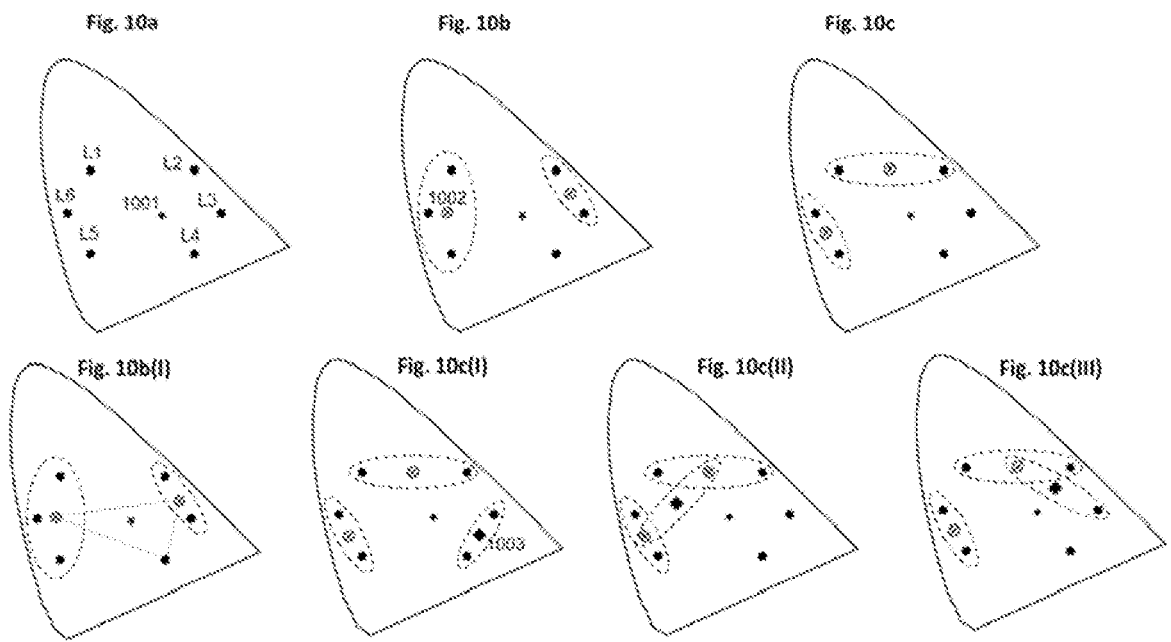

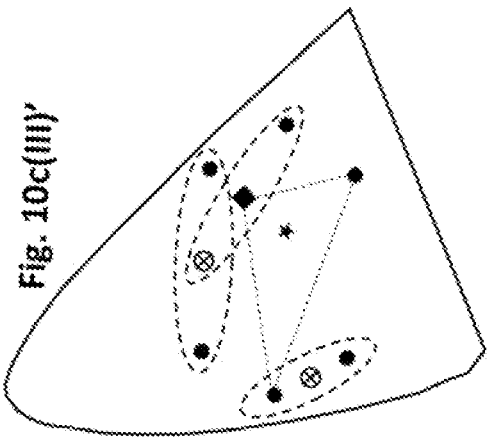
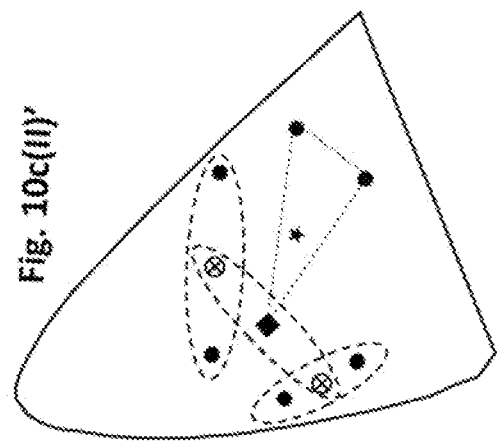
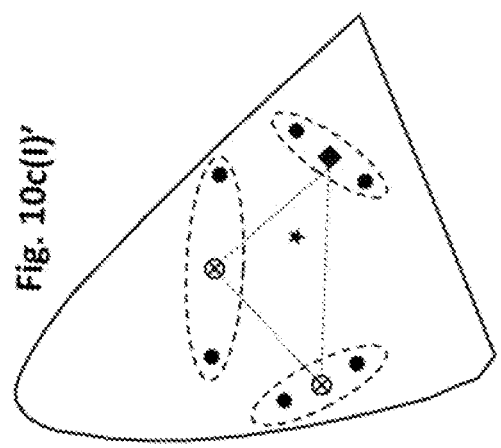

METHOD OF MULTI-MODE COLOR CONTROL BY AN LED DRIVER

CROSS-REFERENCE TO RELATED APPLICATIONS

This application is a U.S. Patent Applications which claims priority to NL Application No. 2023938, filed Oct. 2, 2019, the disclosure of which is incorporated herein by reference in its entirety for all purposes.

BACKGROUND

The technical field of the present invention relates to illumination systems using Light Emitting Diodes (LEDs).

At present, conventional lighting applications are more and more replaced by illumination systems using LEDs. LEDs have several advantages over incandescent lighting, such as higher power to light conversion efficiency, faster and more precise lighting intensity and color control by controlling a current flowing though the LEDs.

In general, an LED based illuminating application comprises a plurality of LEDs and an LED driver for powering the LEDs by providing the current through the LEDs. Such an LED driver in general comprises a power converter such as a switched mode power supply (e.g. Buck or Boost converter) and a control unit for controlling the power converter. Based on the color characteristics of the plurality of LEDs applied, a color gamut, i.e. a collection or set of colors that can be generated by the plurality of LEDs, can be defined. Such a color gamut can e.g. be represented in a color space.

For a long time, LED based illumination devices have applied LED sets that generate three primary colors, usually red, green and blue. These primary colors thus define the color gamut, i.e. the set of colors that can be generated. Introducing more LEDs, a wider color gamut is possible, but this leads to higher complexity and cost. In particular, when more than three LEDs or LED groups are present, it may no longer be possible to calculate one single gamut to reach a desired color point, when the color point is in an overlapping area of two or more gamuts. In such arrangement, an infinite number of solutions is possible to arrive, based on the color characteristics of the LEDs, at the desired color point. Further, it can be mentioned that power consumption is an important issue in illumination systems and thus many activities are ongoing to decrease the power consumption. It would be desired to have an efficient and straightforward manner of determining how to generate a desired color characteristic for an LED based illumination devise that has more than three different LEDs or LED groups.

SUMMARY OF THE INVENTION

It is an object of the invention to provide a method of controlling an LED fixture comprising a plurality of LEDs. In particular, in accordance with the present invention, the plurality of LEDs comprises at least four different LEDs or LED groups, wherein each LED or LED group has a different color, as e.g. characterised in a color space. It is an object of the present invention to efficiently determine how to control the plurality of LEDs in such manner that the plurality of LEDs, or a subset thereof, emit light of different colors in a manner to reach a desired color and a desired intensity.

In order to achieve this or other goals, the invention provides a first method comprising:

receiving a set point representing a desired color and a desired intensity of the light to be generated by the LED fixture;

determining, based on available color characteristics of the plurality of LEDs, at least two different subsets of the plurality of LEDs and a set of intensity set points for each of the at least two different subsets, wherein each set of intensity set points results in obtaining or approximating the desired color and the desired intensity by the LED fixture;

selecting the subsets of the plurality of LEDs with the corresponding sets of intensity set points which meet a predetermined criterion.

The first method according to the invention comprises the step of receiving a set point, the set point comprising a desired color and a desired intensity of the light to be generated by the light fixture. The LED fixture may e.g. comprise a plurality of LEDs. The plurality of LEDs comprises at least four different LEDs. The plurality of LEDs of the LED fixture may e.g. be arranged in one or more strings, thus forming a series connection of LEDs, and/or may be arranged in a parallel connection. The set point as received may e.g. be a mathematical description of the desired color and the desired intensity in a color space (e.g. the CEI Yxy color space, wherein xy are the chromaticity coordinates of the desired color and Y represents the overall intensity). In particular, the set point represents the desired color and intensity in a color space. The color space is a specific organization of colors, for example the CIE 1931 color space, which can be visualised in a chromaticity diagram.

When a plurality of LEDs are provided in an LED fixture, the LEDs e.g. having different color characteristics, the LED fixture will generate a resulting color when each of the plurality of LEDs or a subset of the LEDs is configured to generate light with a particular intensity. The intensity of each of the LEDs may e.g. be characterised by an intensity set point. As such, a set of intensity set points associated with a particular subset of the plurality of LEDs may characterize the intensities of the subset of LEDs that, when applied, result in the obtaining or approximating of the desired color at the desired intensity, as represented by the set point. The set of intensity set points of the corresponding subset of the plurality of LEDs represents the mathematical description of the intensities of the LEDs to obtain or approximate the desired color and intensity in the color space. In particular, the set of intensity set points of the corresponding subset of the plurality of LEDs represents the obtained or approximated desired color and intensity in the color space.

In the first step of the first method according to the invention, the receiving of a set point representing a desired color at a desired intensity for the light to be generated by the LED fixture, is established. Such set point may e.g. be a co-ordinate in the CEI color space of the desired color with a corresponding intensity value. Typically, both characteristics, i.e. color and intensity, can be regulated or controlled separately during operation. For example, in addition to a color set point, there could be an intensity set point, representing a desired intensity or dimming value of the desired color.

After receiving the set point by the LED fixture, the first method according to the invention comprises a second step of determining, based on available color characteristics of the plurality of LEDs, at least two different subsets of the plurality of LEDs, and a set of intensity set points for each of the at least two different subsets, wherein each set of intensity set points, when applied, results in obtaining or approximating the desired color at the desired intensity by the LED fixture. The available color characteristics of the plurality of LEDs provides information about each LED or LED unit of the LED fixture. The available color characteristics may in particular comprise information that enables to determine a co-ordinate in a color space for the LEDs. The determination step of the method according to the invention is to determine those subsets of the plurality of LEDs which sufficiently obtain or approximate the desired color at the desired intensity, as represented by the set point. The term 'sufficiently' indicates that an error margin between the color as obtained by the application of a particular set of intensity set points and the set point should e.g. be minimal. The error margin may e.g. be defined as a chromaticity distance between a first co-ordinate in a color space of the obtained or approximated desired color and intensity by the set of intensity set points of the corresponding subset of the plurality of LEDs and a second chromaticity co-ordinate in the color space of the desired color and intensity. The general definition of the chromaticity distance in a particular color space is the difference or distance between two colors in a chromaticity diagram. As most definitions of color distance are distances within a color space, the standard means of determining distances is the Euclidean distance. However, there are a number of formulae to calculate the chromaticity distance. The available color characteristics may further comprise e.g. the LED color rendering index (CRI), LED spectrum, LED chromaticity, LED color stability etc. The CRI value refers to a quantitative measure of the ability of a light source to reveal the colors of various objects faithfully in comparison with an ideal or natural light source. Further, a subset of the plurality of LEDs comprises at least one LED unit of the LED fixture.

When the different subsets of the plurality of LEDs with the corresponding sets of intensity set points are determined, the third step of the first method according to the invention provides the selection of the subsets of the plurality of LEDs with the corresponding sets of intensity set points which meet a predetermined criterion. The predetermined criterion may be chosen from a large variety of criteria or constraints and can be considered as a second requirement that needs to be fulfilled by a particular subset of the plurality of LEDs to be selected.

In an embodiment, the first method according to the invention further comprises the steps of selecting the subset of the plurality of LEDs with the corresponding sets of intensity set points which meet best the predetermined criterion and using the selected subset to drive the plurality of LEDs with the corresponding set of intensity set points. In an embodiment, meeting best a predetermined criterion may include maximising or optimising the criterion. As such, the selection may involve selecting a subset for which the criterion reaches has a maximum or optimum value. When two or more subsets fulfils the predetermined criterion, e.g. having a CRI value of 80 or more, the subset with the highest CRI value can be selected.

In an embodiment, the predetermined criterion of the first method according to the invention may comprise e.g. a CRI value of the sets of intensity set points of the corresponding subsets of the plurality of LEDs, whereby said CRI value may e.g. be maximized by the selection, and/or an efficiency value of the sets of intensity set points of the corresponding subsets of the plurality of LEDs, which efficiency value may be maximized by the selection, and/or a lifetime value of the sets of intensity set points of the corresponding subsets of the plurality of LEDs, which lifetime value is maximized and/or a sensitivity value of the sets of intensity set points of the corresponding subsets of the plurality of LEDs, which sensitivity value is minimized. Furthermore, in an embodiment the predetermined criterion of the first method according to the invention comprises a desired intensity value, wherein the selecting step of the method comprises selecting the set of intensity set points of the corresponding subset of the plurality of LEDs with an intensity value, which intensity value meets best the predetermined criterion. In an alternative embodiment, the predetermined criterion is a weighted combination of the CRI value and/or efficiency value and/or lifetime value and/or intensity value and/or sensitivity value, which weighted combination is optimized. The sensitivity value is the ratio of the deviation of the intensity over the deviation of the current. A high sensitivity value means a high intensity shift upon a current variation, which is undesirable.

In an embodiment, the determining step of the first method according to the invention comprises an algorithm to calculate e.g. for each subset the set of intensity set points based on the available color characteristics of the LEDs and the set point.

In an embodiment, the first method according to the invention comprises a chromaticity distance between a first co-ordinate in a color space representing the obtained or approximated color by the set of intensity set points of the corresponding subset of the plurality of LEDs and a second chromaticity co-ordinate in the color space representing the desired color, which chromaticity distance (e.g. the distance metric of CIE, i.e. $\Delta E76$) is smaller than 2, preferably the chromaticity distance is smaller than 1 For example, the chromaticity distance may be calculated in the CEI color space for each set of intensity set points of the corresponding subset of the plurality of LEDs, which meets the predetermined criterion. An alternative, are the MacAdam steps SDCM (standard deviation for color matching), which define the size of a MacAdams Ellipse in a color space. Preferably the SDCM is smaller than 3, more preferably smaller than 2.

In an embodiment, the determination step of different subsets according to the first method of the invention is directed at choosing only subsets of maximal three LEDs. Thus, each subset comprises three LEDs or less. In this situation, the determination of the set of intensity set points for each subset is a straightforward calculation as there is only one solution.

The first method according to the invention enables to control or regulate a plurality of LEDs in an optimized manner to obtain or approximate the desired color at the desired intensity. This may be demonstrated by an example. Suppose that the LED fixture comprises four LEDs: a red LED, a green LED, a first blue LED and a second blue LED. The desired color, represented by a set point, is a color composed of 25% red, 70% green and 5% blue and with an emitted light intensity by the LED fixture of 80% of the maximal light intensity (i.e. the intensity reached when a maximal current is provided to all the LEDs). The maximal current need not be the same as the nominal current. Typically, the nominal current is the current which can continuously flow through an LED and which causes the LED to operate at a desired operating temperature or within a certain temperature range, so as to ensure a certain desired lifetime of the LED, e.g. expressed in illumination hours. In this example, multiple different subsets of the plurality of LEDs can be determined: e.g. a first subset composed of the red LED, the green LED and the first blue LED or a second subset composed of the red LED and the green LED or a third subset composed of the red LED and the second blue LED etc. For each subset, a set of intensity set points may be determined that results in the desired color, e.g. the second subset composed of the red LED and green LED may have an associated set of intensity set points with an intensity percentage of 25% of the red LED and an intensity percentage of 75% of the green LED. The intensity percentage is defined w.r.t. the nominal current or more specifically, there is an intensity percentage of 100% when nominal current is flowing. Further, the predetermined criterion may comprise an CRI value (e.g. 70). In this example, assume that only two subsets of the plurality of LEDs with the corresponding sets of intensity set points meet the predetermined criterion, namely the second subset, having a CRI value of 78, with the corresponding set of intensity set points, e.g. an intensity percentage of 25% of the red LED and an intensity percentage of 75% of the green LED, and the first subset, having a CRI value of 71, with the corresponding set of intensity set points, e.g. an intensity percentage of 25% of the red LED, an intensity percentage of 74% of the green LED and an intensity percentage of 1% of the first blue LED.

In an advantageous embodiment, the method according to the invention further comprises the selection of the subset of the plurality of LEDs with the corresponding set of intensity set points which meets best the predetermined criterion. The method may further comprise the usage of the set of intensity set points of the corresponding selected subset of the plurality of LEDs to the plurality of LEDs of the LED fixture to obtain or approximate the desired color at the desired intensity. Applied to the aforementioned example, the second subset with the corresponding set of intensity set points may meet best the predetermined criterion, i.e. the second subset with the corresponding set of intensity set points pertains to the highest CRI value which obtains or approximates the desired color and intensity in the most optimal manner.

In an embodiment, the method according to the invention further comprises the selection of the set of intensity set points of the corresponding subset of the plurality of LEDs with a minimal number of LEDs, when at least two different sets of intensity set points of the corresponding subsets of the plurality of LEDs meet the predetermined criterion.

The first method according to the invention enables to control or regulate a plurality of LEDs in an optimized manner to obtain or approximate the desired color. This may be demonstrated by an example. Suppose that the LED fixture comprises six LEDs: a red LED (R), a green LED (G), an blue LED (B), a warm white LED (WW), a natural white LED (NW) and a cold white LED (CW). Remark that the latter three LEDs are located on the Planckian locus or black body locus in the CIE chromaticity diagram. This locus is visualised by a curve in the CIE chromaticity diagram and this curve visualises the path that the color of a black body takes as the blackbody temperature changes.

In the first situation, the set point, representing a desired color at a desired intensity, is located further away from the black body locus. In this easy example, the second method according to the invention arranges for example the six LEDs into two different subsets: one subset comprises the RGB gamut and the second subset comprises the WW, NW and CW LEDs gamut. If the chromaticity distance ΔE76 between the color point and the Planckian locus is larger than two, then the RGB gamut is selected. Otherwise, if the chromaticity distance is smaller than two, the WW, NW and CW is selected.

The invention provides a second method of controlling an LED fixture comprising a plurality of LEDs, the plurality of LEDs comprising at least four LEDs, configured to emit light of different colors, the second method comprising:

a) receiving a set point representing a desired color at a desired intensity for the light to be generated by the LED fixture;
  b) arranging, based on the received set point and/or available color characteristics of the plurality of LEDs and/or a predetermined criterion, at least a part of the plurality of LEDs in one or more different subsets, wherein each subset comprises at least two different LEDs;
  c) determining for each subset a virtual LED, based on the color characteristics of the LEDs of the subset, assuming a predetermined current-ratio of the LEDs of the subset, and replacing each subset by the determined virtual LED;
  d) selecting the subsets of the plurality of LEDs which meet best the predetermined criterion or a further predetermined criterion.

The second method according to the invention comprises a first step of receiving a set point, the set point representing a desired color at a desired intensity for the light to be generated by the LED fixture. After receiving the set point by the LED fixture, the second method according to the invention comprises a second step of arranging, based on the received set point and/or available color characteristics of the plurality of LEDs and/or a predetermined criterion, at least a part of the plurality of LEDs in one or more different subsets, wherein each subset comprises at least two different LEDs. The predetermined criterion may be chosen from a large variety of criteria or constraints (e.g. CRI value) and can be considered a requirement that needs to be fulfilled.

The next step of the second method according to the invention determines for each subset a virtual LED, based on the color characteristics of the LEDs of the subset, assuming a predetermined current-ratio of the LEDs of the subset, and replacing each subset by the determined virtual LED. In this step of the second method according to the invention, an LED characteristic of an LED, referred to as the virtual LED, is construed, based on the color characteristics of the LEDs of the subset and under the assumption that the LEDs of the subset will be supplied with a current or currents have a predetermined current-ratio. As an example, the current ratio can be 1. In such case, the LEDs of the subset of LEDs are thus assumed to be supplied with the same current or currents with the same amplitude or duty cycle. When a predetermined current-ratio is assumed, the color characteristic of the virtual LED can e.g. be construed based on the color characteristics of the LEDs of the subset, said color characteristics e.g. including a location in the CIE diagram or in a color space. The virtual LED can then be used in lieu of the physical LEDs in the calculations. With this step the number of unknown variables decreases. The predetermined current-ratio of the LEDs of the subset can lie between 0 and 100%. A current-ratio of 100% means that the LEDs of the subset are provided with the same current or currents with the same amplitude or duty cycle.

In the last step of the second method, the subsets of the plurality of LEDs are selected which meet best the predetermined criterion or a further predetermined criterion. The further predetermined criterion may be chosen from a large variety of criteria or constraints (e.g. efficiency value) and can be considered a requirement that needs to be fulfilled.

In an embodiment, the steps b-d of the second method according to the invention are repeated, using the virtual LEDs and remaining LEDs as the plurality LEDs, until the sum of virtual LEDs and remaining LEDs is three. Once there are only three LEDs remaining, the required currents to arrive at a desired set point can be easily determined. The calculation is straightforward, because there is only one solution possible.

In an embodiment, the second method according to the invention further comprises the determination of a set of intensity set points for the selected subsets. The set of intensity set points of the corresponding subset of the plurality of LEDs represents the mathematical description of the intensities of the LEDs to obtain or approximate the desired color and intensity in the color space.

In a further embodiment, each selected subset of the second method according to the invention is used to drive the plurality of LEDs with the corresponding set of intensity set points.

According to a second aspect of the invention, there is provided a first LED driver configured to control a LED fixture comprising a plurality of LEDs, the plurality of LEDs comprising at least four LEDs, configured to emit light of different colors, the LED driver comprising:
  a power converter for converting an input power at an input terminal to a current at an output terminal,
  a control unit arranged to control the power converter, as such the power converter provides the current to the LED fixture, and wherein the control unit is further arranged to:
    receive a set point representing a desired color and intensity for the light to be generated by the LED fixture;
    determine, based on available color characteristics of the plurality of LEDs, at least two different subsets of the plurality of LEDs and a set of intensity set points for each of the at least two different subsets, wherein each set of intensity set points, when applied by the LED driver, would result in obtaining or approximating the desired color and intensity by the LED fixture;
    select the subsets of the plurality of LEDs with the corresponding sets of intensity set points which meets best a predetermined criterion;
    use the selected subset to drive the plurality of LEDs with the corresponding set of intensity set points.

According to a second aspect of the invention, there is also provided a second LED driver configured to control a LED fixture comprising a plurality of LEDs, the plurality of LEDs comprising at least four LEDs, configured to emit light of different colors, the LED driver comprising:
  a power converter for converting an input power at an input terminal to a current at an output terminal,
  a control unit arranged to control the power converter, as such the power converter provides the current to the LED fixture, and wherein the control unit is further arranged to:
    receive a set point representing a desired color at a desired intensity for the light to be generated by the LED fixture;
    arrange, based on the received set point and/or available color characteristics of the plurality of LEDs and/or a predetermined criterion, at least a part of the plurality of LEDs in one or more different subsets, wherein each subset comprises at least two different LEDs;
    determine for each subset a virtual LED, based on the color characteristics of the LEDs of the subset, assuming a predetermined current-ratio of the LEDs of the subset, and replacing each subset by the determined virtual LED;
    select the subsets of the plurality of LEDs which meet best a predetermined criterion or a further predetermined criterion.

In general, a power converter of a LED driver according to the invention is powered at an input terminal by a power supply, e.g. a DC power supply derived from a mains supply by means of an AC/DC converter. Such an AC (alternating current)/DC (direct current) converter can be arranged to convert an alternating current source (or more general, a power source) to a substantially direct current source (or more general, a power source). AC/DC converters are widely applied to convert an AC power source such as a mains connection (e.g. 230 V, 50 Hz) to a DC power source. The output of said DC power source may then be applied to power a load or may be applied to power a further power source such as a power converter of an LED driver.

The plurality of LEDs of the LED fixture are powered by a power converter, which power converter can be a switched mode power supply (SMPS). Such a switched mode power source may e.g. comprise an inductance, an unidirectional element such as a diode and a switching element, e.g. a FET or a MOSFET. The switching of the switching element can e.g. be controlled by a controller or control unit. At present, different types of power sources (in particular current sources) are applied for such powering of the plurality of LEDs. As an example, a so-called buck-regulator can be applied. It is further acknowledged that other types of power converters such as boost, buck-boost, CUK, SEPIC or other, either synchronous or non-synchronous may advantageously be applied in combination with the present invention.

A control unit of the LED driver according to the invention receives a set point representing a desired color and intensity for the light to be generated by the light fixture. To control the power converter to provide a current to the LED fixture, which results in obtaining or approximating the desired color with the desired characteristics (e.g. intensity), the control unit of the LED driver may send a current control signal to the power converter. The current control signal could be an on/off signal, e.g. an analogue or digital signal to switch on/off the switching element of the power converter, thereby e.g. controlling the generated current.

In an embodiment, the control unit of the LED driver according to the invention is configured to send a LED control signal for operating at least one switch, wherein each switch is parallel to a different LED unit of the LED fixture, to obtain or approximate the desired color and intensity. The LED control signal could be an on/off signal, e.g. an analogue or digital signal to switch on/off a switch parallel to a LED unit. In addition, the control unit can send a current control signal to the power converter to control the power converter to provide a current to the plurality of LEDs of the LED fixture. The switching of a switch parallel to a LED unit is to set the LED unit in the on or off state. For example, the set of intensity set points of the corresponding subset may e.g. be composed of 50% of a blue LED to obtain or approximate the desired color. Note that the percentage is related to the intensity percentage at nominal current, as explained above. In this case, the switch parallel to the blue LED is half of the time open (i.e. the blue LED is on) and half of the time closed (i.e. the blue LED is off). In a preferred embodiment, the control unit of the LED driver comprises multiple switch control terminals, wherein each switch control terminal is connected to a different switch.

The control unit may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc.

In an embodiment, the control unit of the LED driver according to the invention is configured to send multiple current control signals to the power converter to control the power converter to provide a current value to each LED unit of the subset of the plurality of LEDs with the corresponding set of intensity points, which current value can be different for each LED unit, to obtain or approximate the desired color and intensity. For example, the set of intensity set points may e.g. be composed of 25% of a red LED and 50% of a blue LED to obtain or approximate the desired color and intensity. In this case, the power converter provides a first current value to the red LED, wherein the first current value is e.g. a quarter of the nominal current and a second current value to the blue LED, wherein the second current value is e.g. the half of the nominal current. In a preferred embodiment, the output terminal of the power converter comprises multiple output terminals, wherein each output terminal is connected to a different LED unit of the LED fixture.

In an embodiment, the control unit of the LED driver according to the invention comprises a first output control terminal and the power converter of the LED driver according to the invention comprises a first input control terminal, wherein the first output control terminal is connected to the first input control terminal. The current control signal may be sent by the control unit at the first output control terminal to the power converter at the first input control terminal.

In an embodiment, the LED control signal and/or the current control signal of the control unit of the LED driver according to the invention is based on the available color characteristics of the plurality of LEDs and the set point. The available color characteristics of the plurality of LEDs may be sent by the LED fixture or by a user interface to the control unit.

In an embodiment, the control unit of the LED driver according to the invention comprises a first control terminal, which first control terminal receives an LED characteristic signal, representing the available color characteristics of the plurality of LEDs. Preferably, the first control terminal of the control unit may be connected to a second control terminal or a user interface. Both non-limiting embodiments could provide information regarding the available color characteristics of the plurality of LEDs to the control unit. The user interface may e.g. be a remote control to prompt the available color characteristics. The second control terminal could be an output terminal of the LED fixture comprising the plurality of LEDs which may be connectable to the control unit.

In an embodiment, the control unit of the LED driver according to the invention comprises a second input control terminal, which second input control terminal receives the set point, representing the desired color and intensity for the light to be generated by the LED fixture.

BRIEF DESCRIPTION OF THE FIGURES

Further advantages, embodiments and features of the invention will become clear from the appended figures and corresponding description, showing non-limiting embodiments in which:

FIGS. 2a, 2b, 2c and 2d depict different subsets of the plurality of LEDs with the corresponding sets of intensity set points chosen such that the resulting color point matches the set point according to FIG. 2;

FIG. 3 schematically depicts an alternative embodiment of a plurality of LEDs of an LED fixture and a set point mapped in a chromaticity diagram;

FIGS. 10a, 10b, 10c, 10b(I), 10c(I), 10c(II), 10c(III), 10c(II)', 10c(II)', and 10c(III)' schematically depict alternative embodiments of a plurality of LEDs of an LED fixture and a set point mapped in a chromaticity diagram according to the second method of the invention.

DESCRIPTION

Figure 1:
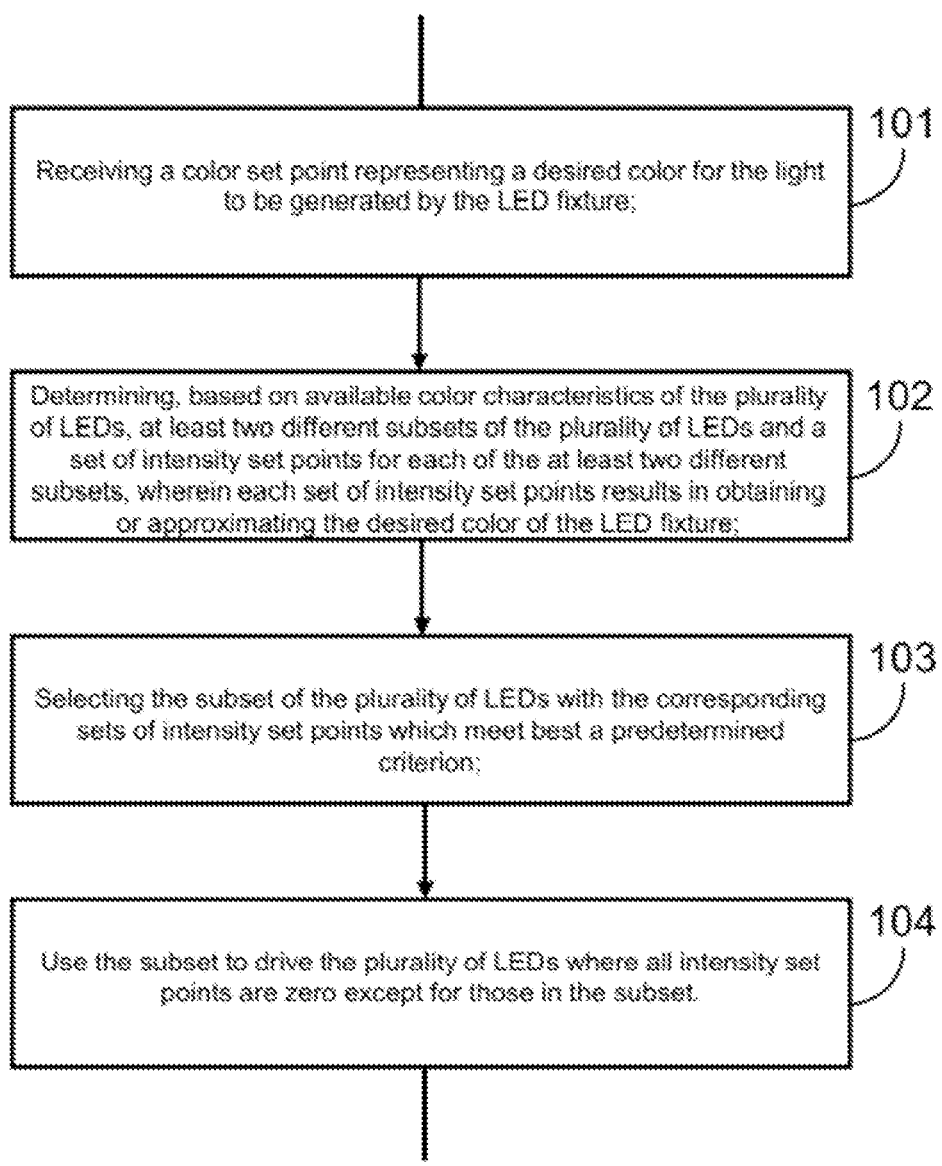
FIG. 1 schematically depicts an embodiment of a flow diagram of the first method according to the invention.

FIG. 1 schematically depicts a flow diagram of an embodiment of the method according to the invention for controlling an LED fixture comprising a plurality of LEDs configured to emit light of different colors in such a manner that a desired color is reached in an optimized way.

The method according to the invention comprises a first step 101 of receiving a set point representing a desired color at a desired intensity for the light to be generated by the LED fixture. The set point can e.g. be a mathematical description of the desired color in a color space. In particular, the set point represents the desired color in the color space. The color space is a specific organization of colors, for example the CIE 1931 color space, which can be visualised in a chromaticity diagram. The set point may e.g. be a co-ordinate in the CEI color space of the desired color with a corresponding intensity value. Also, alternatives to a mathematical description in a color space can be thought of, e.g. any signal that can be mapped, e.g. by a control unit, to a color space. In such case, the mathematical conversion is actually performed in the control unit.

Further, the method comprises a second step 102, determining, based on available color characteristics of the plurality of LEDs, at least two different subsets of the plurality of LEDs and a set of intensity set points for each of the at least two different subsets, wherein each set of intensity set points results in obtaining or approximating the desired color by the LED fixture. A set of intensity set points associated with a particular subset of the LEDs may e.g. characterize the intensities of the subset of LEDs that, when applied, result in the obtaining or approximating of the desired color, as represented by the set point. The set of intensity set points of the corresponding subset represents the mathematical description of the obtained or approximated desired color by the corresponding subset of the plurality of LEDs of the LED fixture in the color space. The available color characteristics of the plurality of LEDs provide information about each LED unit of the LED fixture. The available color characteristics may in particular comprise information that enables to determine a co-ordinate in a color space for the LEDs. The available color characteristics may further comprise e.g. the LED color rendering index (CRI), LED spectrum, LED chromaticity, LED color stability etc.

Thereafter, the method comprises a third step 103, selecting the subsets of the plurality of LEDs with the corresponding sets of intensity set points which meet a predetermined criterion. When multiple subsets fulfil the predetermined criterion, a second predetermined criterion is chosen so as to be left with only one single subset. Another possibility, is to select randomly a subset when a plurality of subsets fulfils the predetermined criterion. In the case that zero subsets fulfil the criterion, then the predetermined criterion would have to be relaxed or the method according to the invention would need to be used to select the subset that comes closest to the required set point. In an embodiment, the predetermined criterion of the method according to the invention may comprise e.g. a CRI value of the sets of intensity set points of the corresponding subsets of the plurality of LEDs, whereby said CRI value may e.g. be maximized by the selection, and/or efficiency value of the sets of intensity set points of the corresponding subsets of the plurality of LEDs, which efficiency value may be maximized by the selection and/or a lifetime value of the sets of intensity set points of the corresponding subsets of the plurality of LEDs, which lifetime value is maximized and/or a sensitivity value of the sets of intensity set points of the corresponding subsets of the plurality of LEDs, which sensitivity value is minimized. Furthermore, in an embodiment, the predetermined criterion of the method according to the invention comprises a desired intensity value, wherein the selecting step of the method comprises selecting the set of intensity set points of the corresponding subset of the plurality of LEDs with an overall intensity value, which overall intensity value meets best the predetermined criterion. In an alternative embodiment, the predetermined criterion is a weighted combination of the CRI value and/or efficiency value and/or lifetime value and/or intensity value and/or sensitivity value, which weighted combination is optimized.

Figure 2:
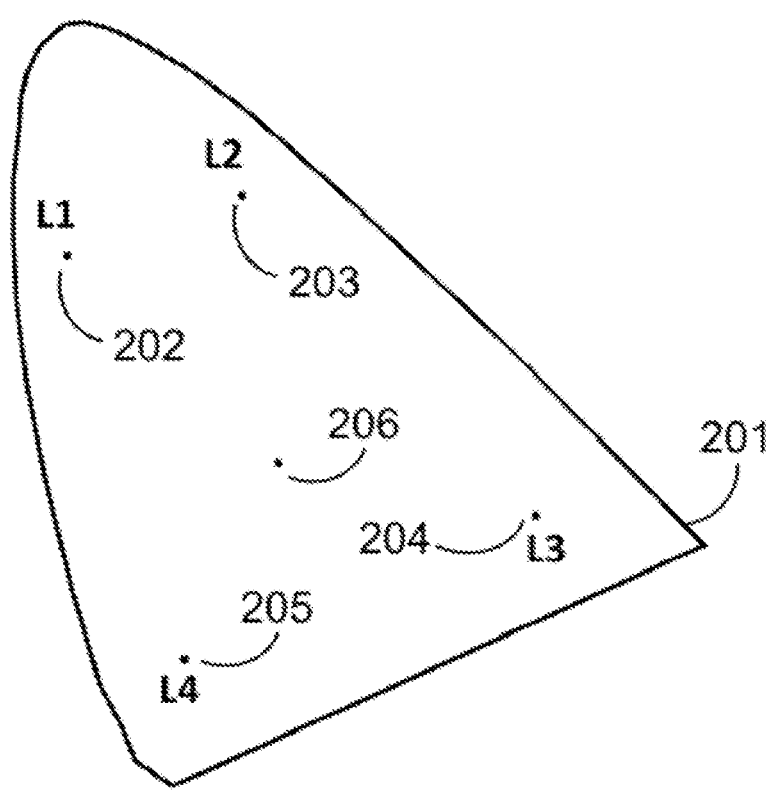
FIG. 2 schematically depicts an embodiment of a plurality of LEDs of an LED fixture and a set point mapped in a chromaticity diagram.

FIG. 2 schematically depicts an embodiment of the method according to the invention, wherein a plurality of LEDs of a LED fixture and a set point are mapped or indicated in a chromaticity diagram 201. In this embodiment, the chromaticity diagram 201 is a CIE 1931 color space chromaticity diagram (x and y axes are not shown). However, also other color spaces are possible. The LED fixture comprises four different LEDs: a first green LED (L1) 202, a second green LED (L2) 203, a red LED (L3) 204 and a blue LED (L4) 205. In this case, the set point 206, i.e. representing a desired color, is mapped approximately in the centre of the chromaticity diagram. The predetermined criterion may be an efficiency value, wherein said efficiency value is for example set at 90%. Concerning the calculation of the efficiency value, the consumed power by the LED driver and the plurality of LEDs of a particular subset with the corresponding set intensity set points is compared to the consumed power when operating in a nominal state, which nominal state corresponds to operating at 100% efficiency. When receiving the set point 206, at least two different subsets of the plurality of LEDs and a set of intensity set points for each of the at least two different subsets, can be determined, based on available color characteristics of the plurality of LEDs.

Figure 2A:
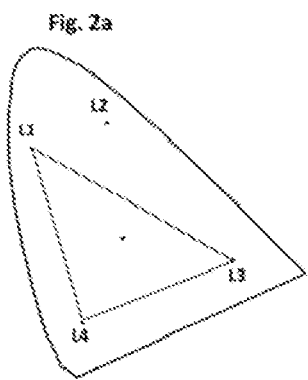

FIG. 2a shows a first subset comprising the first green LED, the red LED and the blue LED. The area or gamut covered by the formed triangle between the LEDs of the first subset represents all the possible colors that can be made with the first subset. For the first subset, the corresponding set of intensity points to obtain or approximate the desired color by the LED fixture may e.g. be composed of 30% of the first green LED, 40% of the blue LED and 30% of the red LED.

Figure 2B:
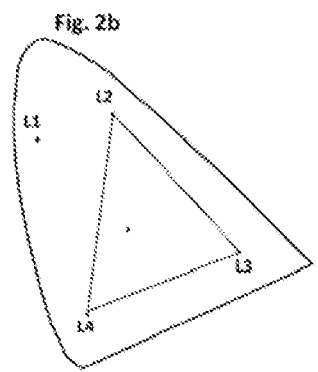

FIG. 2b shows a second subset comprising the second green LED, the red LED and the blue LED. The area covered by the formed triangle between the LEDs of the second subset represents all the possible colors that can be made with the second subset. For the second subset, the corresponding set of intensity points to obtain or approximate the desired color at the desired intensity by the LED fixture may e.g. be composed of 30% of the second green LED, 40% of the blue LED and 30% of the red LED. Note that it may be possible that not every color in the entire gamut can be made at the desired intensity because one or more of the LED currents may become the maximum current deliverable by the LED driver before having influenced the color enough to approximate or obtain the desired color. With the given percentages in this example, the user desired overall intensity is approximately 33% when defining the overall intensity at 100% as the intensity when all the three involved LEDs are operating at 100% intensity (i.e. at their nominal state). Suppose that the user want to have an overall intensity of 99%, then the required percentage of the blue LED would become 120%, i.e. well above the nominal current. This shows that the color point is no longer achievable at a desired overall intensity of 99%. Thus, there is an intensity limit on reachable colors in the different subsets.

Figure 2C:
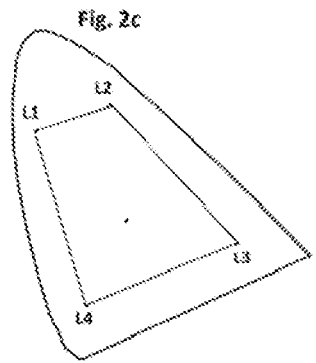

FIG. 2c shows a third subset comprising the first green LED, the second green LED, the red LED and the blue LED. The area covered by the formed trapezium between the LEDs of the third subset represents all the possible colors that can be made with the third subset. For the third subset, the corresponding set of intensity points to obtain or approximate the desired color by the LED fixture may e.g. be composed of 25% of the first green LED, 25% of the second green LED, 25% of the blue LED and 25% of the red LED.

Note that for example a fourth subset comprising only the first green LED and the second green LED may not be sufficient enough to obtain or approximate the desired color by the LED fixture. The error or offset between the color obtained by a set of intensity set points of the fourth subset and the set point is too high.

Suppose that the set of intensity set points of the corresponding third subset of FIG. 2c does not meet the predetermined criterion, because the usage of four LEDs is less efficient compared to the usage of three LEDs. Therefore, the set of intensity set points of the corresponding first subset of FIG. 2a and the set of intensity set points of the corresponding second subset of FIG. 2b are selected which meet the predetermined criterion.

FIG. 3 schematically depicts an embodiment of the method according to the invention, wherein a plurality of LEDs of an LED fixture and a set point are mapped in a chromaticity diagram 301. In this embodiment, the chromaticity diagram 301 is a CIE 1931 color space chromaticity diagram (x and y axes are not shown). However, also other color spaces are possible. The LED fixture comprises four different LEDs: a first green LED (L1) 302, a second green LED (L2) 303, a red LED (L3) 304 and a blue LED (L4) 305. In this case, the set point 306 is almost mapped approximately in between the first green LED and the blue LED. The predetermined criterion may be an efficiency value, wherein said efficiency value is for example set at 90%. When receiving the set point 306, at least two different subsets of the plurality of LEDs and a set of intensity set points for each of the at least two different subsets, can be determined, based on available color characteristics of the plurality of LEDs.

Figure 3A:
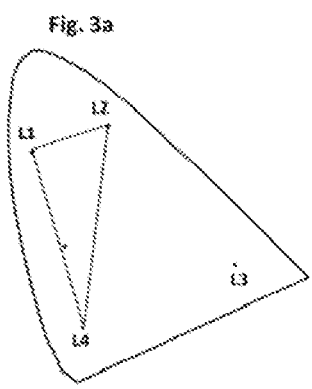
FIGS. 3a, 3b and 3c depict different subsets of the plurality of LEDs with the corresponding sets of intensity set points chosen such that the resulting color point matches the set point according to FIG. 3.

FIG. 3a shows a first subset comprising the first green LED, the second green LED and the blue LED. The area covered by the formed triangle between the LEDs of the first subset represents all the possible colors that can be made with the first subset. For the first subset, the corresponding set of intensity points to obtain or approximate the desired color by the LED fixture may e.g. be composed of 47.5% of the first green LED, 5% of the second green LED and 47.5% of the blue LED.

Figure 3B:
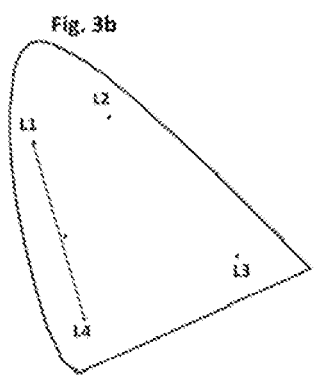

FIG. 3b shows a second subset comprising the first green LED and the blue LED. The straight line between the two LEDs of the second subset represents all the possible colors that can be made with the second subset. For the second subset, the corresponding set of intensity points to obtain or approximate the desired color by the LED fixture may e.g. be composed of 50% of the first green LED and 50% of the blue LED. As can be noticed, the set point does not lie on the gamut of the 2 LEDs. Despite the (small) offset between the set of intensity points and the set point, the second subset may meet the predetermined criterion.

Figure 3C:
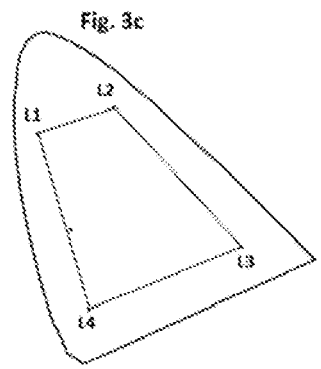

FIG. 3c shows a third subset comprising the first green LED, the second green LED, the red LED and the blue LED. The area covered by the formed trapezium between the LEDs of the third subset represents all the possible colors that can be made with the third subset. For the third subset, the corresponding set of intensity points to obtain or approximate the desired color by the LED fixture may e.g. be composed of 45% of the first green LED, 5% of the second green LED, 5% of the red LED and 45% of the blue LED.

Suppose that the set of intensity set points of the corresponding third subset of FIG. 3c does not meet the predetermined criterion, because the usage of four LEDs is less efficient compared to the usage of three LEDs or two LEDs. Therefore, the set of intensity set points of the corresponding first subset of FIG. 3a and the set of intensity set points of the corresponding second subset of FIG. 3b are selected which meet the predetermined criterion. When the method according to the invention, further comprises selecting the set of intensity set points of the corresponding subset of the plurality of LEDs with a minimal number of LEDs, the second subset of FIG. 3b may be selected since the second subset comprises only 2 LEDs.

Figure 4:
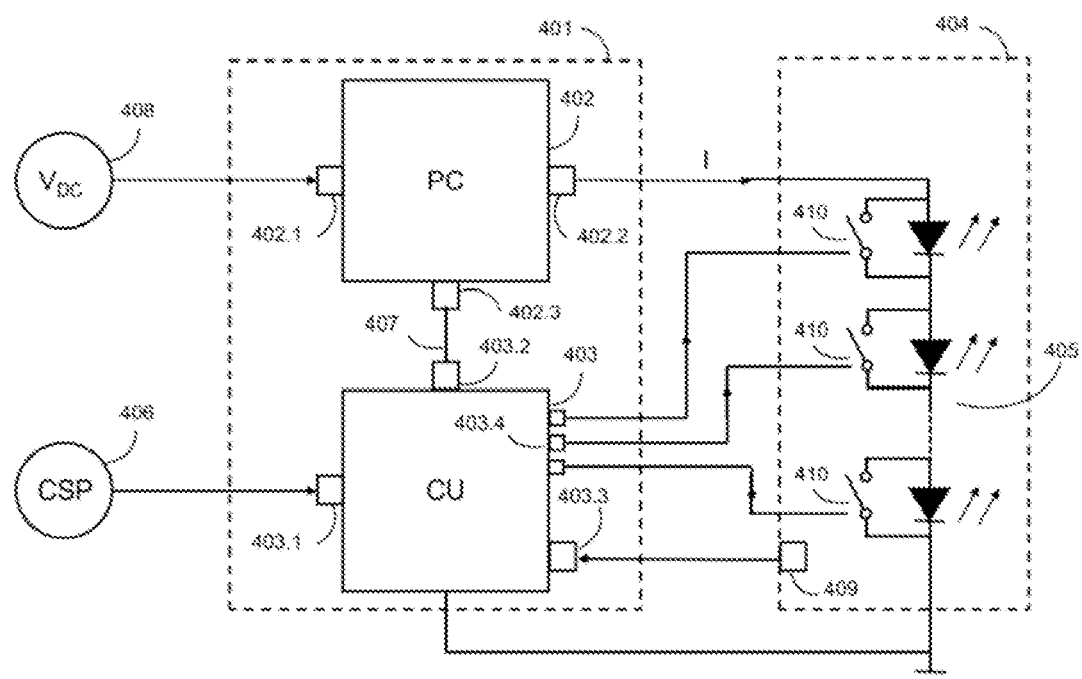
FIG. 4 schematically depicts a first embodiment of the LED driver according to the invention to drive the plurality of LEDs of the LED fixture.

FIG. 4 schematically depicts an embodiment of the LED driver according to the invention to drive a plurality of LEDs of a LED fixture. The LED driver 401 according to the invention comprises a power converter 402 for converting an input power at an input terminal 402.1 to a current I at an output terminal 402.2 and a control unit 403 arranged to control the power converter 402 such that the power converter 402 provides the current to the LED fixture 404 comprising the plurality of LEDs 405 configured to emit light of different colors. The control unit is further arranged to receive a set point 406 representing a desired color at a desired intensity for the light to be generated by the LED fixture 404. In an embodiment, the control unit 403 may comprise a second input control terminal 403.1, which second input control terminal 403.1 receives the set point 406. In an alternative embodiment, in addition to the set point, the second input control terminal 403.1 of the control unit 403 may receive an intensity set point, representing the intensity or dimming value of the desired color, which is at default the nominal intensity (i.e. when a nominal current is applied). The control unit 403 is further arranged to send a current control signal via a communication connection 407 at a first output control terminal 403.2 to a first input control terminal 402.3 of the power converter 402 to control the power converter 402. A current control signal is sent via the communication connection 407 by the control unit 403 to the power converter 402 to provide a current to the LED fixture 404. The magnitude of the current may be adjustable by the current control signal to dim or intensify the emitted light by the plurality of LEDs.

The power converter 402 of the LED driver 401 is powered at an input terminal 402.1 by a power supply 408. In FIG. 4, the power supply 408 is a DC supply voltage 408, supplying DC voltage $V_{DC}$. The required DC voltage can e.g. be derived from a mains supply, e.g. via an AC/DC converter. AC/DC converter are widely applied to convert an AC power source such as a mains connection (e.g. 230 V, 50 Hz) to a DC power source. The output of said DC power source may then be applied to power a load or may be applied to power a further power source such as a power converter of an LED driver.

In an embodiment, the control unit 403 may comprise a first control terminal 403.3, which first control terminal 403.3 can receive an LED characteristic signal, representing the available color characteristics of the plurality of LEDs. In an embodiment, the control unit is configured to execute the first method or second method according to the invention. Based on the available color characteristics of the plurality of LEDs, the control unit is arranged to determine at least two different subsets of the plurality of LEDs and a set of intensity set points for each of the at least two different subsets, wherein each set of intensity set points results in obtaining or approximating the desired color by the LED fixture 404. The control unit 403 is further arranged to select the subsets of the plurality of LEDs 405 with the corresponding sets of intensity set points which meet a predetermined criterion. In FIG. 4, the first control terminal 403.3 of the control unit 403 is connected to a second control terminal 409. The second control terminal 409 may be an output terminal of e.g. a second control unit of the LED fixture 404, comprising the plurality of LEDs 405. The second control terminal 409 of the LED fixture 404 could be arranged to receive or hold the available color characteristics of each LED (e.g. the CRI value) and send the information to the control unit 403 of the LED driver 401. The second control unit may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc. Also other examples are applicable to receive the available color characteristics of each LED and send the available color characteristics to the control unit 403 of the LED driver 401, such as RFID-tags or a set of resistors or a passive memory chip f.e. readable through UNI-I/O or a user interface.

In an embodiment, the control unit 403 of the LED driver 401 is configured to send a LED control signal for operating at least one switch, wherein each switch 410 is parallel to a different LED unit of the LED fixture 404, to obtain or approximate the desired color. The control unit 403 may comprise multiple switch control terminals 403.4, wherein each switch control terminal 403.4 is connected to a different switch 410. In FIG. 4, based on the available color characteristics and the set point 406, the control unit sends the LED control signal via multiple switch control terminals 403.4 to each switch 410 parallel to an LED unit of the LED fixture 404.

The LED control signal could be an on/off signal, e.g. an analogue or digital signal to switch on/off a switch 410 parallel to a LED unit. In addition, the control unit 403 sends the current control signal to the power converter 402 to control the power converter 402 to provide a current to the plurality of LEDs 405 of the LED fixture 404. The switching of a switch 410 parallel to a LED unit is to set the LED unit in the on or off state. For example, the set of intensity set points of the corresponding subset may e.g. comprise an intensity set point for the first LED-group of 50% to obtain or approximate the desired color. In this case, the switch parallel to the first LED is half of the time open (i.e. the first LED is on) and half of the time closed (i.e. the first LED is off).

In an embodiment, the LED driver according to the invention may be configured to execute the second method according to the invention. The LED driver is configured to control a LED fixture comprising a plurality of LEDs, the plurality of LEDs comprising at least four LEDs, configured to emit light of different colors, in accordance with the method according to the invention. In such embodiment, the LED driver comprises a power converter for converting an input power at an input terminal to a current at an output terminal and a control unit arranged to control the power converter to provide the current to the LED fixture.

The control unit is further arranged to:
receive a set point representing a desired color at a desired intensity for the light to be generated by the LED fixture;
arrange, based on the received set point and/or available color characteristics of the plurality of LEDs and/or a predetermined criterion, at least a part of the plurality of LEDs in one or more different subsets, wherein each subset comprises at least two different LEDs;
determine for each subset a virtual LED, based on the color characteristics of the LEDs of the subset, assuming a predetermined current-ratio of the LEDs of the subset, and replacing each subset by the determined virtual LED;
select the subsets of the plurality of LEDs which meet best a predetermined criterion.

Figure 5:
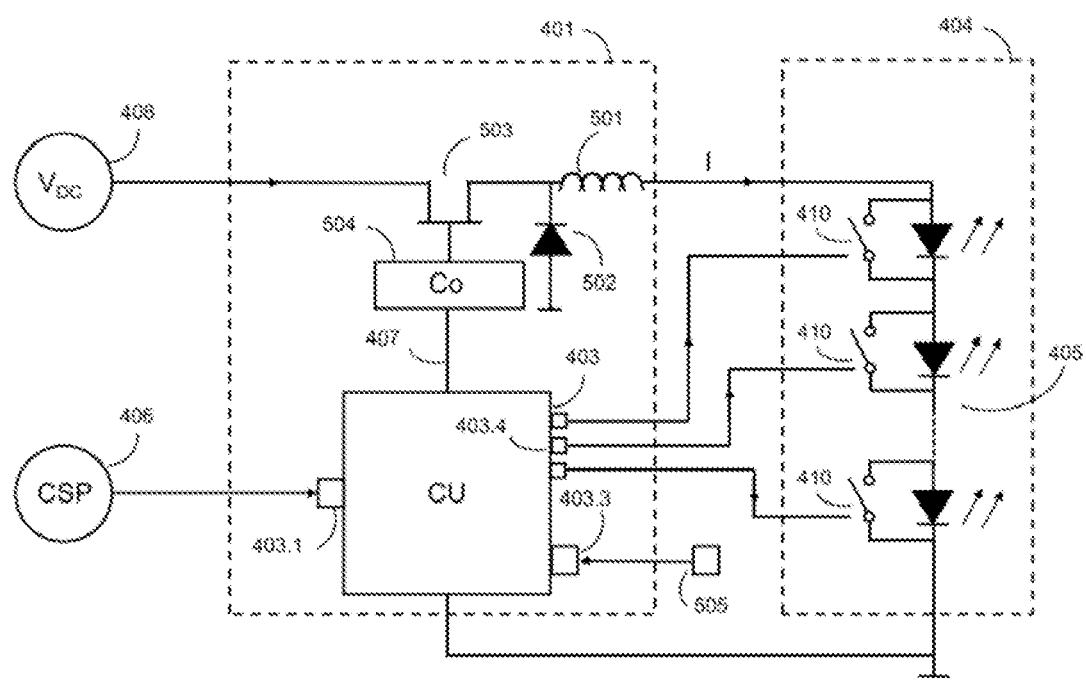
FIG. 5 schematically illustrates a switched mode power supply as the power converter of the LED driver according to the invention to drive the plurality of LEDs of the LED fixture.

FIG. 5 schematically illustrates a switched mode power supply as the power converter of the LED driver 401 according to the invention to drive the plurality of LEDs of the LED fixture. The LED driver 401 as shown in FIG. 5 comprises a power converter or a switched mode power supply and a control unit 403 to control the power converter to drive the plurality of LEDs 405 of the LED fixture 405 by providing a current I. The power converter as shown in FIG. 5 is a so-called Buck converter, arranged to convert an input voltage VDC 405 to the signal line coming from 408 to a current I. In general, such a switched mode power converter comprises an inductance 501, a unidirectional element 502 such as a diode and a switching element 503, e.g. a FET or a MOSFET. Also, other types of converters such as boost, buck-boost, CUCK, SEPIC or other, either synchronous or non-synchronous may advantageously be applied in combination with the present invention. The switching of the switching element 503 can be controlled by a controller (Co) 504, based upon the current control signal from the control unit 403 of the LED driver 401 which current control signal is sent via a communication connection 407 to the controller 504. Note that the functionality of the control unit 403 and the controller 504 can be combined into one control unit.

In an embodiment, the control unit 403 comprises a first control terminal 403.3, which first control terminal 403.3 receives an LED characteristic signal, representing the available color characteristics of the plurality of LEDs 405. In FIG. 5, the first control terminal 403.3 of the control unit 403 is connected to a user interface 505. The user interface 505 may e.g. be a remote control to prompt the available color characteristics of the plurality of LEDs 405. The LED driver 401 in FIG. 5 further comprises the same features as the LED driver in FIG. 4. A combination of the FIGS. 4 and 5 embodiments may also be provided. As an example, the available color characteristics received by the first control terminal 403.1 of the control unit in FIG. 4, wherein the first control terminal is connected to a second control terminal 409, may be used in FIG. 5, wherein the first control terminal 403.1 of the control unit 403 is connected to the user interface 505, and vice versa.

The LED driver of FIG. 5 may also be configured to perform the first method or the second method according to the invention. In an embodiment, the control unit of the LED driver is configured to arrange, based on the received set point and/or available color characteristics of the plurality of LEDs and/or a predetermined criterion, at least a part of the plurality of LEDs in one or more different subsets, wherein each subset comprises at least two different LEDs. Further, the control unit is arranged to determine for each subset a virtual LED, based on the color characteristics of the LEDs of the subset, assuming a predetermined current-ratio of the LEDs of the subset, and replacing each subset by the determined virtual LED. Finally, the control unit is configured to select the subsets of the plurality of LEDs which meet best a predetermined criterion.

Figure 6:
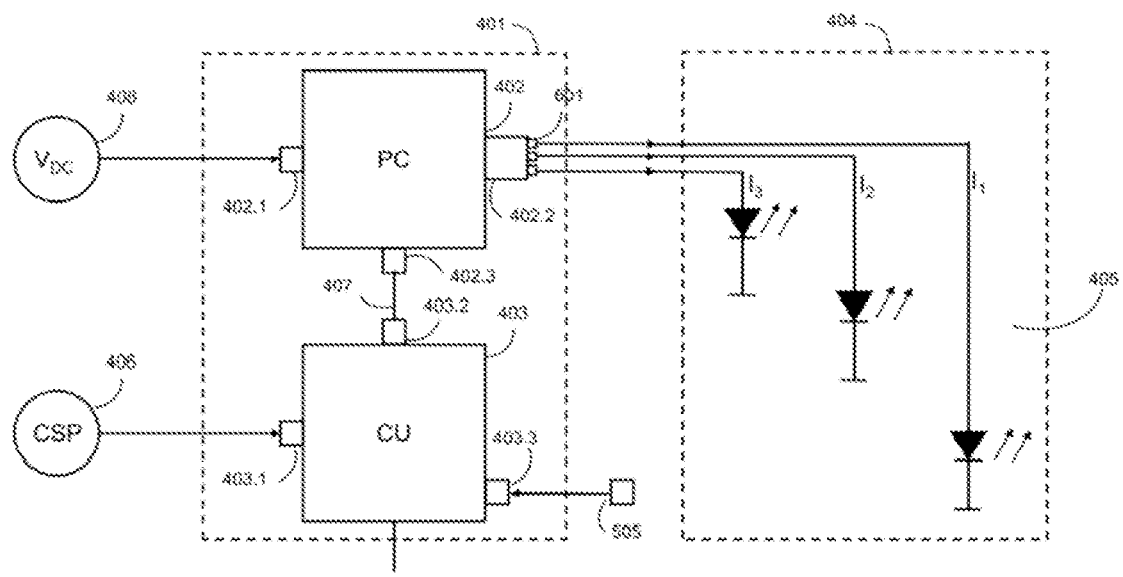
FIG. 6 schematically depicts a second embodiment similar to FIG. 4 of the LED driver according to the invention to drive the plurality of LEDs of the LED fixture.

FIG. 6 schematically depicts a second embodiment similar to FIG. 4 of the LED driver according to the invention to drive a plurality of LEDs of a LED fixture. The LED driver 401 according to the invention comprises a power converter 402 for converting an input power at an input terminal 402.1 to a current at an output terminal 402.2 and a control unit 403 arranged to control the power converter 402 such that the power converter 402 provides the current to the LED fixture 404 comprising the plurality of LEDs 405 configured to emit light of different colors.

The control unit of the LED driver of FIG. 6 is configured to perform the first method or the second method according to the invention. In an embodiment, the control unit 403 may comprise a first control terminal 403.3, which first control terminal 403.3 can receive an LED characteristic signal, representing the available color characteristics of the plurality of LEDs. Based on the available color characteristics of the plurality of LEDs 405, the control unit is arranged to determine at least two different subsets of the plurality of LEDs 405 and a set of intensity set points for each of the at least two different subsets, wherein each set of intensity set points results in obtaining or approximating the desired color by the LED fixture 404. The control unit is further arranged to select the subsets of the plurality of LEDs 405 with the corresponding sets of intensity set points which meet a predetermined criterion.

In an embodiment, the LED driver according to the invention is configured to receive a set point representing a desired color at a desired intensity for the light to be generated by the LED fixture. The LED driver comprises a power converter for converting an input power at an input terminal to a current at an output terminal and a control unit arranged to control the power converter, as such the power converter provides the current to the LED fixture. The control unit is further configured to arrange, based on the received set point and/or available color characteristics of the plurality of LEDs and/or a predetermined criterion, at least a part of the plurality of LEDs in one or more different subsets, wherein each subset comprises at least two different LEDs. Further, the control unit is arranged to determine for each subset a virtual LED, based on the color characteristics of the LEDs of the subset, assuming a predetermined current-ratio of the LEDs of the subset, and replacing each subset by the determined virtual LED. Finally, the control unit is configured to select the subsets of the plurality of LEDs which meet best a predetermined criterion.

The control unit 403 is further configured to send multiple current control signals via a communication connection 407 at a first output control terminal 403.2 to a first input control terminal 402.3 of the power converter 402. The multiple current control signals are sent via the communication connection 407 by the control unit 403 to the power converter 402 to control the power converter to provide a current value to each LED unit of the subset of the plurality of LEDs 405 with the corresponding set of intensity set points, which current value can be different for each LED unit (e.g. I1, I2 and I3), to obtain or approximate the desired color. The multiple current control signals of the control unit may be based on the available color characteristics of the plurality of LEDs 405 and the set point 406. The magnitude of the current, or rather the intensity may be controllable by the multiple current control signals to dim or intensify the emitted light by the plurality of LEDs 405. In an embodiment, the output terminal of the power converter comprises multiple output terminals 601, wherein each output terminal 601 is connected to a different LED unit of the LED fixture 404.

Figure 7:
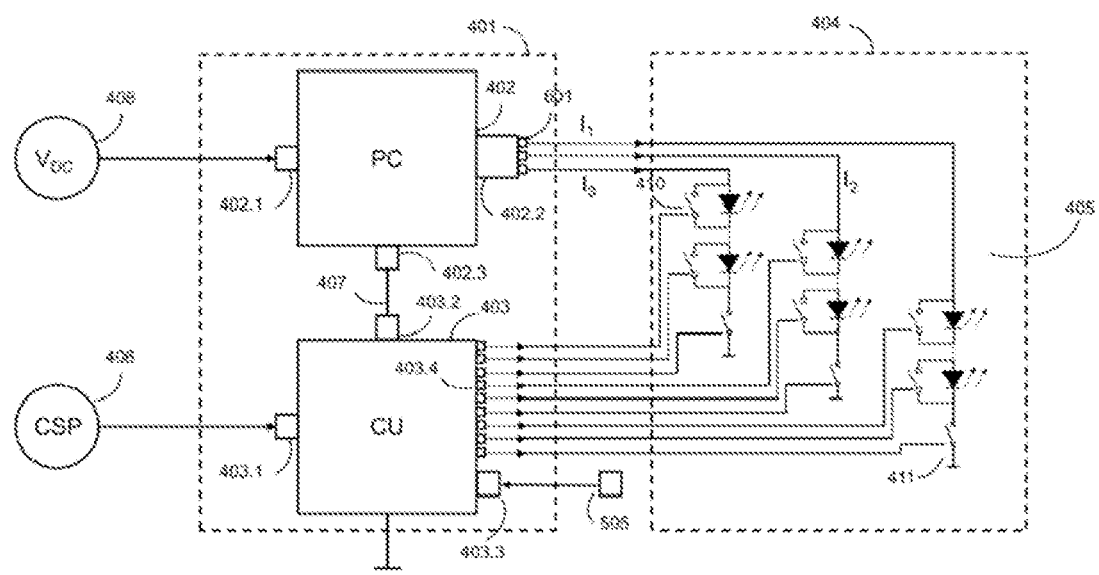
FIG. 7 schematically depicts a third embodiment as similar to FIGS. 4 and 6 of the LED driver according to the invention to drive the plurality of LEDs of the LED fixture, FIG. 8 schematically depicts an embodiment of a flow diagram of the second method according to the invention.

FIG. 7 schematically depicts a third embodiment similar to FIGS. 4 and 6 of the LED driver according to the invention to drive a plurality of LEDs of a LED fixture. The LED driver 401 comprises a power converter 402 and a control unit 403, wherein both the power converter 402 and the control unit 403 can directly drive the plurality of LEDs 405 of the LED fixture 404. The LED driver of FIG. 7 may also be configured to perform the first method or the second method according to the invention.

The control unit 403 is configured to send multiple current control signals via a communication connection 407 at a first output control terminal 403.2 to a first input control terminal 402.3 of the power converter 402 (i.e. similar as in FIG. 6). The multiple current control signals are sent via the communication connection 407 by the control unit 403 to the power converter 402 to control the power converter to provide a current value to each LED unit of the subset of the plurality of LEDs 405 with the corresponding set of intensity set points, which current value can be different for each LED unit (e.g. I1, I2 and I3), to obtain or approximate the desired color. The multiple current control signals of the control unit may be based on the available color characteristics of the plurality of LEDs 405 and the set point 406. The magnitude of the current, or rather the intensity may be controllable by the multiple current control signals to dim or intensify the emitted light by the plurality of LEDs 405. In an embodiment, the output terminal of the power converter comprises multiple output terminals 601, wherein each output terminal 601 is connected to a different LED unit of the LED fixture 404.

The control unit 403 of the LED driver 401 is further configured to send a LED control signal for operating at least one switch, wherein each switch 410 is parallel to a different LED unit of the LED fixture 404, to obtain or approximate the desired color (i.e. similar as in FIG. 4). The control unit 403 may comprise multiple switch control terminals 403.4, wherein each switch control terminal 403.4 is connected to a different switch 410. Based on the available color characteristics and the set point 406, the control unit 403 send the LED control signal via multiple switch control terminals 403.4 to each switch 410 parallel to a LED unit of the LED fixture 404. In this way, the current flowing through a LED unit can be controlled with higher precision by the combined multiple current control signals and LED control signal sent by the control unit 403.

At the end of each chain, a switch 411 is arranged in series with the LED of a particular chain of LEDs of the LED fixture 404. The control unit 403 is also connected to each switch 411, to control said switch. Hence, the control unit can be configured to control all LEDs in the particular chain at the same time by sending the LED control signal via multiple switch control terminal 403.4 to the switch 411 of the chain.

Figure 8:
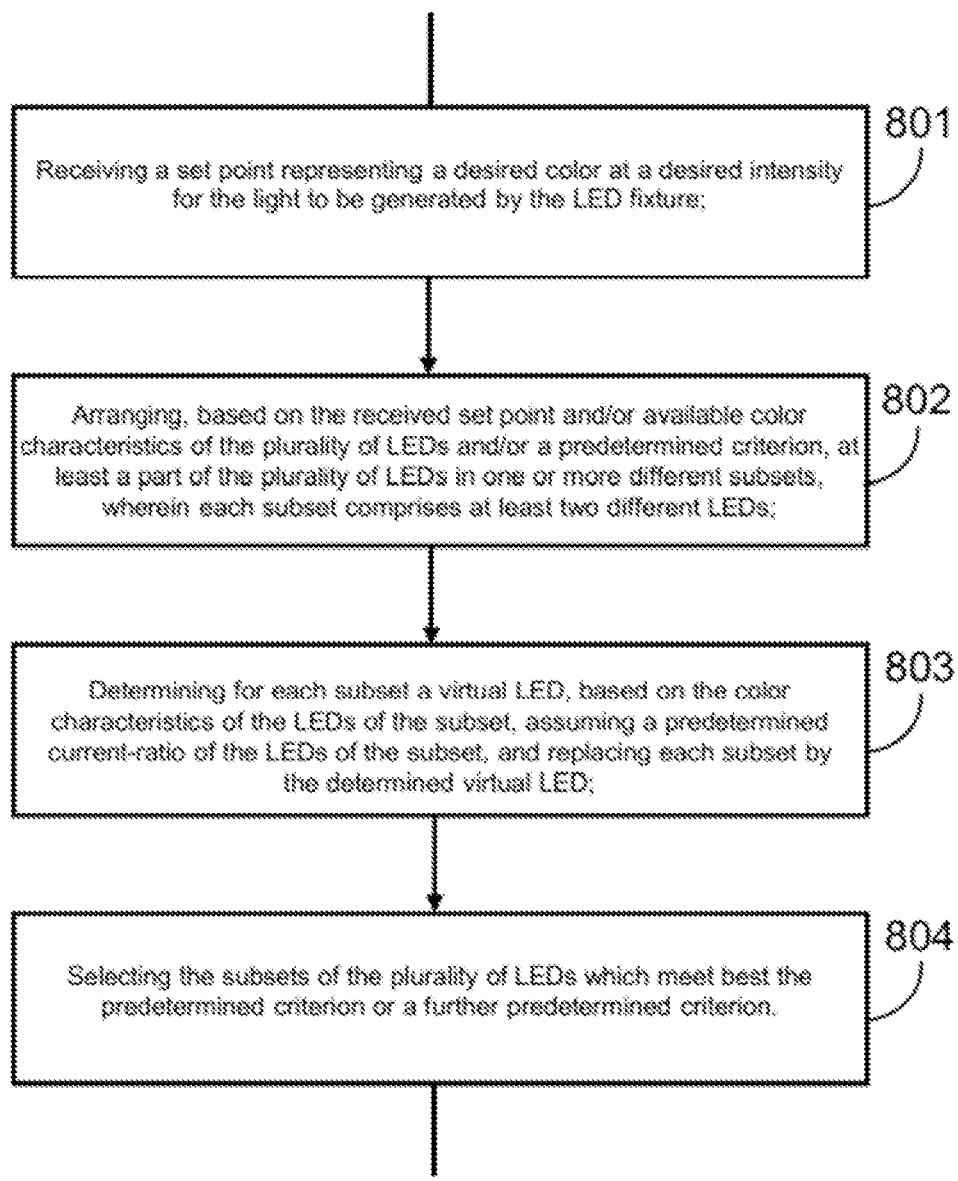

FIG. 8 schematically depicts a flow diagram of an embodiment of the second method according to the invention for controlling an LED fixture comprising a plurality of LEDs configured to emit light of different colors.

The method according to the invention comprises a first step 801 of receiving a set point representing a desired color at a desired intensity for the light to be generated by the LED fixture.

Further, the method comprises a second step 802, arranging, based on the received set point and/or available color characteristics of the plurality of LEDs and/or a predetermined criterion, at least a part of the plurality of LEDs in one or more different subsets, wherein each subset comprises at least two different LEDs. The arrangement of the plurality of LEDs in one or more different subsets reduces the needed calculation time and complexity to obtain or approximate the desired color. The predetermined criterion may e.g. be the error margin between the plurality of LEDs and the desired color.

Thereafter, the method comprises a third step 803, defining for each subset a virtual LED based on the color characteristics of the LEDs of the subset, assuming a predetermined current-ratio of the LEDs of the subset, and replacing each subset by the virtual LED. With the predetermined current-ratio the current through the LEDs of a subset is determined in advance. The predetermined current-ratio is between 0 and 100% and may be different for different subsets. For example, when a subset comprises two different LEDs and the current-ratio is 100%, the virtual LED lies exactly in the middle of the virtual line on a color diagram between the two LEDs, i.e. each LED of the subset is provided with the same current or a current having the same amplitude or duty cycle.

The fourth step of the second method according to the invention comprises the selecting of the subsets of the plurality of LEDs which meets best the predetermined criterion or a further predetermined criterion. In an embodiment, the predetermined criterion or the further predetermined criterion of the second method according to the invention may comprise e.g. a CRI value of the sets of intensity set points of the corresponding subsets of the plurality of LEDs, whereby said CRI value may e.g. be maximized by the selection, and/or efficiency value of the sets of intensity set points of the corresponding subsets of the plurality of LEDs, which efficiency value may be maximized by the selection and/or a lifetime value of the sets of intensity set points of the corresponding subsets of the plurality of LEDs, which lifetime value is maximized and/or a sensitivity value of the sets of intensity set points of the corresponding subsets of the plurality of LEDs, which sensitivity value is minimized.

In an embodiment, the second, third and fourth step of the second method according to the invention are repeated, using the virtual LEDs and remaining LEDs as the plurality LEDs, until the sum of virtual LEDs and remaining LEDs is three. Once there are only three LEDs remaining, the required currents to arrive at a desired set point can be easily determined. The calculation is straightforward, because there is only one solution possible.

In an embodiment, the second method according to the invention further comprises the determination of a set of intensity set points for the selected subsets. The set of intensity set points of the corresponding subset of the plurality of LEDs represents the mathematical description of the intensities of the LEDs to obtain or approximate the desired color and intensity in the color space.

In a further embodiment, each selected subset of the second method according to the invention is used to drive the plurality of LEDs with the corresponding set of intensity set points.

Figure 9A:
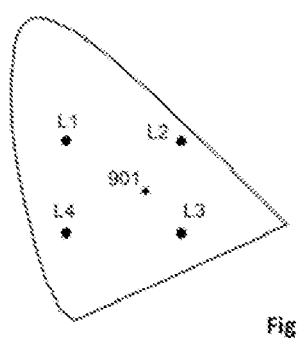
FIGS. 9a, 9b, 9c, 9d, 9e, 9b(I), 9c(I), 9d(I), and 9e(I) schematically depict embodiments of a plurality of LEDs of an LED fixture and a set point mapped in a chromaticity diagram according to the second method of the invention.

FIG. 9a schematically illustrates an embodiment of the second method according to the invention, wherein a plurality of LEDs of a LED fixture and a set point are mapped in a chromaticity diagram. The LED fixture comprises four different LEDs (L1, L2, L3 and L4), indicated by the filled circles. The set point 901 is visualised by the star-shaped symbol.

FIGS. 9b-e show different examples of possible configurations to arrange the plurality of LEDs, based on the received set point and/or available color characteristics of the plurality of LEDs and/or a predetermined criterion, in one or more different subsets, wherein each subset comprises at least two different LEDs. The predetermined criterion may e.g. be the CRI of the LEDs.

FIGS. 9b-e depict four possible subsets: an arrangement or combination of L1 and L4 (FIG. 9b), L2 and L3 (FIG. 9c), L1 and L2 (FIG. 9d) and L3 and L4 (FIG. 9e) respectively. Note that these arrangements are for illustrative purposes and also other subsets are possible. For each subset in FIGS. 9b-e a virtual LED 902 can be defined, based on the color characteristics of the LEDs of the subset, assuming a predetermined current-ratio of the LEDs of the subset. For the subsets in FIGS. 9b-e the current-ratio of the LEDs of the subset is set at 100%. The current-ratio can e.g. be considered the current of L1 over the current of L4 for the arrangement of FIG. 9b. Thus, the virtual LEDs, indicated by the white dots with marks, are located at the centre between two LEDs of a subset/

Figure 9B:
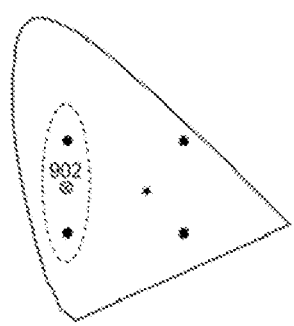
Figure 9C:
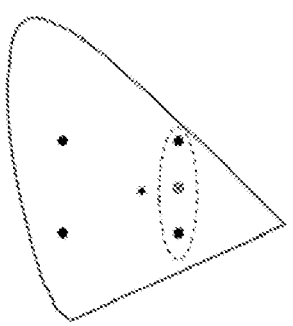
Figure 9D:
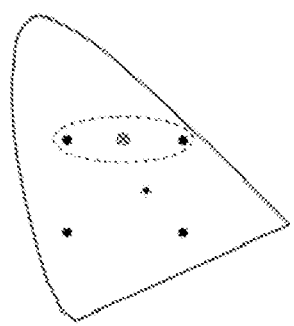
Figure 9E:
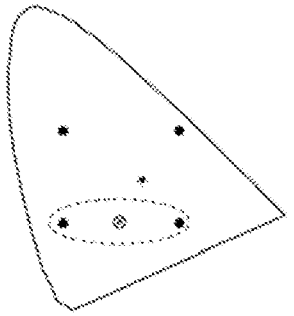
Figure 9C:
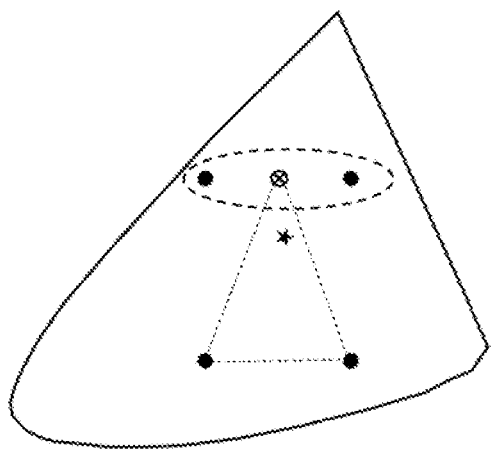
Figure 9B:
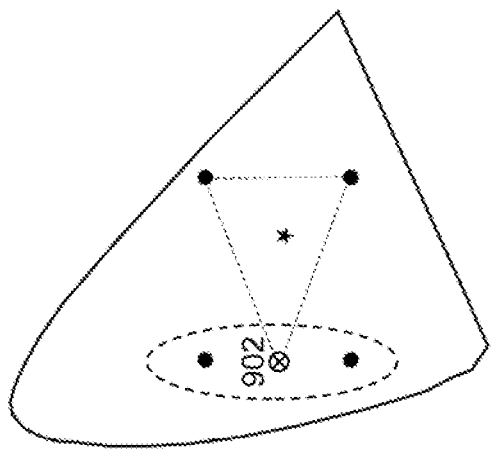
Figure 9E:
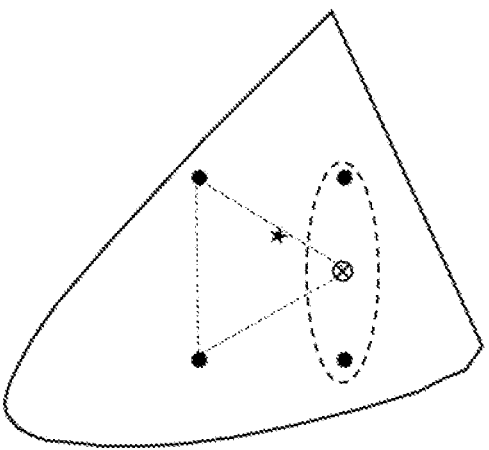
Figure 9D:
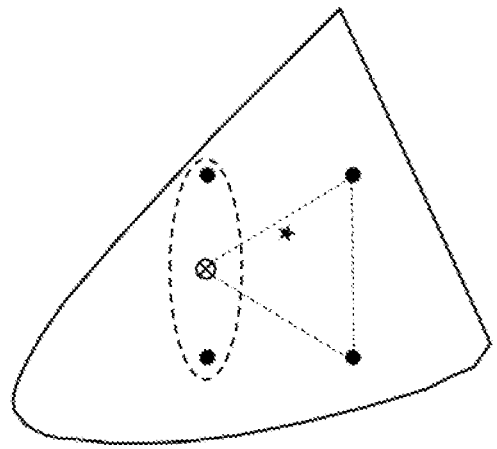

After the virtual LEDs are determined, the subsets of the plurality of LEDs which meet a predetermined criterion are selected. The predetermined criterion may e.g. be the efficiency. In FIGS. 9b(I)-e(I), the set point falls inside the boarders of the formed triangular area (see dotted lines) or gamut defined by two remaining LEDs of the plurality of LEDs and a virtual LED of the subset.

FIG. 10a schematically illustrates another embodiment of the second method according to the invention, wherein a plurality of LEDs of a LED fixture and a set point are mapped in a chromaticity diagram. The LED fixture comprises six different LEDs (L1, L2, L3, L4, L5 and L6), indicated by the filled circles. The set point 1001 is visualised by the star-shaped symbol.

FIGS. 10b-c show two different examples of possible configurations to arrange the plurality of LEDs, based on the received set point and/or available color characteristics of the plurality of LEDs and/or a predetermined criterion, in one or more different subsets, wherein each subset comprises at least two different LEDs. The predetermined criterion may e.g. be the CRI of the LEDs.

FIGS. 10b-c depict two possible arrangements: a first arrangement of subset L1, L5 and L6 with subset L2 and L3 (FIG. 10b) and a second arrangement of subset L5 and L6 with subset L1 and L2 (FIG. 10c). Note that these arrangements are for illustrative purposes and also other subsets are possible. For each subset in FIGS. 10b-c a virtual LED 1002 can be defined, based on the color characteristics of the LEDs of the subset, assuming a predetermined current-ratio of the LEDs of the subset. For the subsets in FIGS. 10b-c the current-ratio of the LEDs of the subset is set at 100%, i.e. all LEDs of a subset are assumed to be supplied by the same current or currents with the same amplitude or duty cycle. Thus, the virtual LEDs, indicated by the white dots with marks, are located at the centre between two LEDs of a subset.

After the virtual LEDs are determined, the subsets of the plurality of LEDs which meet a predetermined criterion are selected. The predetermined criterion may e.g. be the CRI. In FIG. 10b(I), the set point inside the boarders of the formed triangular area (see dotted lines) or gamut defined by two remaining LEDs of the plurality of LEDs and a virtual LED of the subset.

For FIG. 10c, the sum of virtual LEDs and remaining LEDs of the plurality of LEDs is four, and thus steps b-d of the second method according to the invention are repeated. FIG. 10c(I-III) show three possible arrangements: a first arrangement of subset comprising L3 and L4 (FIG. 10c(I)), a second arrangement of subset comprising the first virtual LED and the second virtual LED (FIG. 10c(II)) and a third arrangement of subset comprising the first virtual LED and L3 (FIG. 10c(III)). Note, that the three arrangements are different types of combinations: a combination with two virtual LEDs, a combination of a virtual LED with a remaining LED and a combination of two remaining LEDs.

In FIG. 10c(I-III) a virtual LED 1003 can be defined, based on the color characteristics of the LEDs of the subset, assuming a predetermined current-ratio of the LEDs of the subset. For the subsets in FIG. 10c(I-III) the current-ratio of the LEDs of the subset is set at 50%. Thus, the virtual LEDs, indicated by the filled rhombus symbol, are located at the centre.

After the virtual LEDs are determined, the subsets of the plurality of LEDs which meet a predetermined criterion are selected. The predetermined criterion may e.g. be the efficiency. In FIG. 10c(I-III)', the set point falls inside the boarders of the formed triangular area (see dotted lines) or gamut defined by the virtual LEDs and/or remaining LEDs.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. A method of controlling an LED fixture comprising a plurality of LEDs, the plurality of LEDs comprising at least four LEDs configured to emit light of different colors, the method comprising:
   a) receiving a set point representing a desired color at a desired intensity for the light to be generated by the LED fixture;
   b) arranging, based on the received set point and/or available color characteristics of the plurality of LEDs and/or a predetermined criterion, at least a part of the plurality of LEDs in one or more different subsets, wherein each subset comprises at least two different LEDs;
   c) determining for each subset a virtual LED, based on the color characteristics of the LEDs of the subset, assuming a predetermined current-ratio of the LEDs of the subset, and replacing each subset by the determined virtual LED;
   d) selecting the subsets of the plurality of LEDs which meet best a further predetermined criterion or the predetermined criterion.

2. The method according to claim 1, wherein a set of intensity set points are determined for the selected subsets.

3. The method according to claim 1, wherein steps b-d are repeated, using the virtual LEDs and remaining LEDs as the plurality LEDs, until the sum of virtual LEDs and remaining LEDs is three.

4. The method according to claim 2, wherein each selected subset is used to drive the plurality of LEDs with the corresponding set of intensity set points.

5. A method of controlling an LED fixture comprising a plurality of LEDs, the plurality of LED comprising at least four LEDs, configured to emit light of different colors, the method comprising:
   receiving a set point representing a desired color at a desired intensity for the light to be generated by the LED fixture;
   determining, based on available color characteristics of the plurality of LEDs, at least two different subsets of the plurality of LEDs and a set of intensity set points for each of the at least two different subsets, wherein each set of intensity set points results in obtaining or approximating the desired color at the desired intensity by the LED fixture;
   selecting the subsets of the plurality of LEDs with the corresponding sets of intensity set points which meet a predetermined criterion;
   using a selected subset to drive the plurality of LEDs with the corresponding set of intensity set points.

6. The method according to claim 5, further comprising selecting the subset of the plurality of LEDs with the corresponding set of intensity set points which meets best the predetermined criterion.

7. The method according to claim 5, wherein the predetermined criterion or a further predetermined criterion comprises a CRI value associated with the sets of intensity set points of the corresponding subsets of the plurality of LEDs.

8. The method according to claim 5, wherein the predetermined criterion or a further predetermined criterion comprises an efficiency value of the sets of intensity set points of the corresponding subsets of the plurality of LEDs.

9. The method according to claim 5, wherein the predetermined criterion or a further predetermined criterion comprises a lifetime value of the sets of intensity set points of the corresponding subsets of the plurality of LEDs.

10. The method according to claim 5, wherein the predetermined criterion or a further predetermined criterion comprises a desired intensity value of the corresponding subsets of the plurality of LEDs, wherein the selecting step of the method comprises selecting the set of intensity set points of the corresponding subset of the plurality of LEDs with an intensity value, which intensity value meets best the predetermined criterion or the further predetermined criterion.

11. The method according to claim 5, wherein the predetermined criterion or a further predetermined criterion comprises a sensitivity value of the sets of intensity set points of the corresponding subsets of the plurality of LEDs.

12. The method according to claim 7, wherein the predetermined criterion or the further predetermined criterion is a weighted combination of the CRI value and/or efficiency value and/or lifetime value and/or intensity value and/or sensitivity value, which weighted combination is optimized.

13. The method according to claim 5, wherein a chromaticity distance, $\Delta E76$, between a first chromaticity co-ordinate in a color space of the obtained or approximated desired color by the set of intensity set points of the corresponding subset of the plurality of LEDs and a second chromaticity co-ordinate in the color space of the desired color is smaller than 2, preferably the chromaticity distance is smaller than 1.

14. The method according to claim 5, further comprising selecting the set of intensity set points of the corresponding subset of the plurality of LEDs with a minimal number of LEDs, when at least two different sets of intensity set points of the corresponding subsets of the plurality of LEDs meets the predetermined criterion.

15. An LED driver configured to control a LED fixture comprising a plurality of LEDs, the plurality of LED comprising at least four LEDs, configured to emit light of different colors, the LED driver comprising:
   a power converter for converting an input power at an input terminal to a current at an output terminal,
   a control unit arranged to control the power converter, as such the power converter provides the current to the LED fixture, and wherein the control unit is further arranged to:
   receive a set point representing a desired color for the light to be generated by the LED fixture;
   determine, based on available color characteristics of the plurality of LEDs, at least two different subsets of the plurality of LEDs and a set of intensity set points for each of the at least two different subsets, wherein each set of intensity set points results in obtaining or approximating the desired color by the LED fixture;

select the subsets of the plurality of LEDs with the corresponding sets of intensity set points which meet a predetermined criterion.

16. An LED driver configured to control a LED fixture comprising a plurality of LEDs, the plurality of LEDs comprising at least four LEDs, configured to emit light of different colors, the LED driver comprising:

a power converter for converting an input power at an input terminal to a current at an output terminal, a control unit arranged to control the power converter, as such the power converter provides the current to the LED fixture, and wherein the control unit is further arranged to:

receive a set point representing a desired color at a desired intensity for the light to be generated by the LED fixture;

arrange, based on the received set point and/or available color characteristics of the plurality of LEDs and/or a predetermined criterion, at least a part of the plurality of LEDs in one or more different subsets, wherein each subset comprises at least two different LEDs;

determine for each subset a virtual LED, based on the color characteristics of the LEDs of the subset, assuming a predetermined current-ratio of the LEDs of the subset, and replacing each subset by the determined virtual LED;

select the subsets of the plurality of LEDs which meet best a predetermined criterion or a further predetermined criterion.

17. The LED driver according to claim 16, wherein the control unit is configured to send a LED control signal for operating at least one switch, wherein each switch is parallel to a different LED unit of the LED fixture, to obtain or approximate the desired color.

18. The LED driver according to claim 16, wherein the control unit is configured to send multiple current control signals to the power converter to control the power converter to provide a current value to each LED unit of the subset of the plurality of LEDs, which current value can be different for each LED unit, to obtain or approximate the desired color.

19. The LED driver according to claim 16, wherein the control unit is configured to send a current control signal to the power converter to control the power converter to provide a current to the plurality of LEDs of the LED fixture.

20. The LED driver according to claim 16, wherein the control unit comprises a first output control terminal and the power converter comprises a first input control terminal, wherein the first output control terminal is connected to the first input control terminal.

21. The LED driver according to claim 16, wherein the control unit comprises multiple switch control terminals, wherein each switch control terminal is connected to a different switch.

22. The LED driver according to claim 16, wherein the output terminal of the power converter comprises multiple output terminals, wherein each output terminal is connected to a different LED unit of the LED fixture.

23. The LED driver according to claim 17, wherein the LED control signal and/or the current control signal of the control unit is based on the available color characteristics of the plurality of LEDs and the set point.

24. The LED driver according to claim 16, wherein the control unit comprises a first control terminal, which first control terminal receives a LED characteristic signal, representing the available color characteristics of the plurality of LEDs.

25. The LED driver according to claim 24, wherein the first control terminal of the control unit is connected to a second control terminal or a user interface.

26. The LED driver according to claim 16, wherein the control unit comprises a second input control terminal, which second input control terminal receives the set point.

* * * * *